US009937997B2

(12) United States Patent
Himmelmann

(10) Patent No.: US 9,937,997 B2
(45) Date of Patent: Apr. 10, 2018

(54) CONFORMAL ACTUATOR OPERATED AIRCRAFT CARGO RESTRAINT MECHANISM

(71) Applicant: Goodrich Corporation, Charlotte, NC (US)

(72) Inventor: Richard Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 300 days.

(21) Appl. No.: 14/884,557

(22) Filed: Oct. 15, 2015

(65) Prior Publication Data

US 2017/0106966 A1 Apr. 20, 2017

(51) Int. Cl.
*B64C 1/20* (2006.01)
*B64C 1/22* (2006.01)

(52) U.S. Cl.
CPC . *B64C 1/22* (2013.01); *B64C 1/20* (2013.01)

(58) Field of Classification Search
CPC ......... B64D 9/003; B60P 7/0892; B64C 1/22; B64C 1/20
See application file for complete search history.

(56) References Cited

U.S. PATENT DOCUMENTS

| | | | |
|---|---|---|---|
| 3,924,544 A | * | 12/1975 | Grau ................. B60P 7/132 410/78 |
| 4,013,017 A | * | 3/1977 | Toyota .............. B61L 15/0036 105/311.1 |
| 4,108,081 A | * | 8/1978 | Blanz ................ B60P 7/132 24/603 |
| 4,203,372 A | | 5/1980 | Artemov |
| 4,375,932 A | | 3/1983 | Alberti |
| 5,265,991 A | | 11/1993 | Herrick |
| 5,346,162 A | | 9/1994 | Belie et al. |
| 5,927,650 A | | 7/1999 | Huber |
| 6,557,800 B2 | | 5/2003 | Medina et al. |

(Continued)

FOREIGN PATENT DOCUMENTS

| | | |
|---|---|---|
| DE | 2410771 | 9/1975 |
| DE | 29502421 | 3/1995 |

(Continued)

OTHER PUBLICATIONS

Invitation Pursuant to Rule 62a(1) EPC dated Mar. 14, 2017 in European Application No. 16194098.6.

(Continued)

*Primary Examiner* — Brian M O'Hara
(74) *Attorney, Agent, or Firm* — Snell & Wilmer, L.L.P.

(57) ABSTRACT

A cargo system is provided. The cargo system may comprise a floor panel, a cargo sled configured to move across the floor panel, and a cargo restraint configured to translate relative to the floor panel. The cargo restraint may comprise a longitudinal restraint rod configured to protrude from the floor panel in a deployed position. The cargo restraint may also comprise a restraint surface disposed on the longitudinal restraint rod. The cargo restraint may enable the cargo sled to pass over the restraint surface in a stowed position. An electromechanical actuator may be mechanically coupled to the longitudinal restraint rod and configured to deploy and stow the cargo restraint.

18 Claims, 9 Drawing Sheets

(56) References Cited

U.S. PATENT DOCUMENTS

| | | |
|---|---|---|
| 6,692,203 B2 * | 2/2004 | Kim .................. B60P 7/132 |
| | | 410/69 |
| 6,695,553 B1 | 2/2004 | Galbreath |
| 6,817,578 B1 * | 11/2004 | Garcia ............ B65D 19/0002 |
| | | 244/118.1 |
| 6,957,613 B2 * | 10/2005 | Taylor ................ B64D 9/00 |
| | | 108/55.5 |
| 7,604,204 B2 | 10/2009 | Jacobsen et al. |
| 7,785,056 B2 | 8/2010 | Sanford et al. |
| 8,066,459 B2 | 11/2011 | Schulze et al. |
| 8,308,107 B2 | 11/2012 | Hettwer |
| 8,840,065 B2 | 9/2014 | Panzram et al. |
| 2014/0377017 A1 | 12/2014 | Panzram et al. |
| 2014/0377043 A1 | 12/2014 | Panzram et al. |
| 2016/0194082 A1 | 7/2016 | Himmelmann |

FOREIGN PATENT DOCUMENTS

| | | |
|---|---|---|
| DE | 202010017426 | 12/2011 |
| EP | 0541928 | 5/1993 |
| GB | 2440062 | 1/2008 |
| WO | 2006123942 | 11/2016 |

OTHER PUBLICATIONS

Extended European Search Report dated Jun. 7, 2016 in European Application No. 16150202.6.
Office Action dated Mar. 23, 2017 in U.S. Appl. No. 14/589,770.
Restriction Requirement dated Dec. 22, 2016 in U.S. Appl. No. 14/589,770.
USPTO; Final Office Action dated Oct. 2, 2017 in U.S. Appl. No. 14/589,770.
EP Search Report dated Aug. 2, 2017 in European Application No. 16194098.6.

* cited by examiner

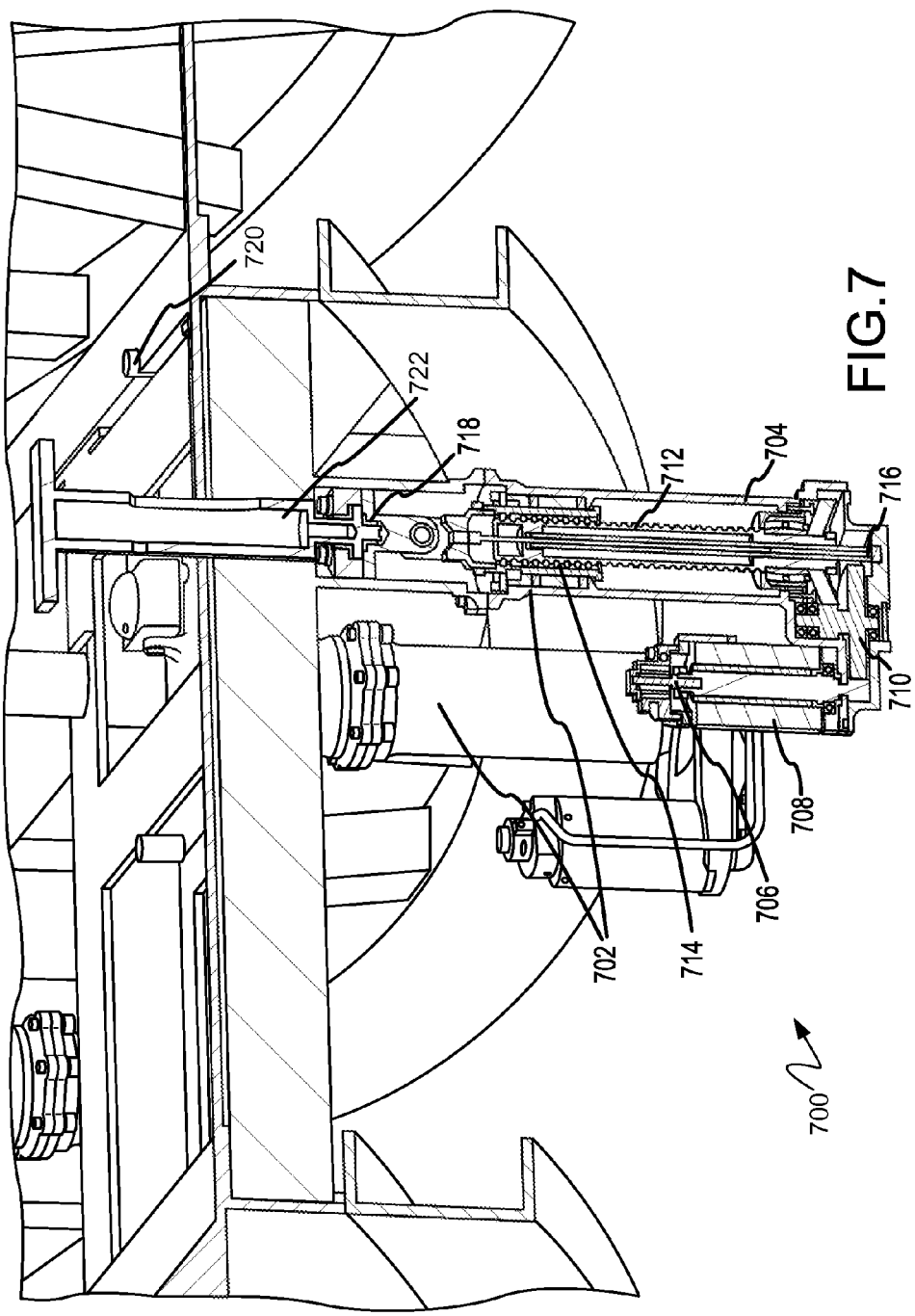

CONFORMAL ACTUATOR OPERATED AIRCRAFT CARGO RESTRAINT MECHANISM

FIELD

The present disclosure relates to a conformal cargo restraint mechanism in a cargo system.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

Once cargo is loaded into a cargo system, cargo may be restrained for flight. The cargo may be fixed in place by ties or other restraints, for example. Manually deploying restraints to retain loaded cargo pallets may be time consuming and rely on user intervention.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A cargo system may comprise a floor panel, a cargo sled configured to move across the floor panel, and a cargo restraint configured to translate relative to the floor panel. The cargo restraint may comprise a longitudinal restraint rod configured to protrude from the floor panel in a deployed position. The cargo restraint may also comprise a restraint surface disposed on the longitudinal restraint rod. The cargo restraint may enable the cargo sled to pass over the restraint surface in a stowed position. An electromechanical actuator may be mechanically coupled to the longitudinal restraint rod and configured to deploy and stow the cargo restraint.

In various embodiments, the restraint surface may be configured to lie flush with the floor panel or recessed within the floor panel in the stowed position. A position sensor may be in communication with the electromechanical actuator with the electromechanical actuator configured to stow the cargo restraint in response to the position sensor detecting a motion of the cargo sled towards the cargo restraint. The electromechanical actuator may also be configured to deploy the cargo restraint in response to the position sensor detecting a motion of the cargo sled away from the cargo restraint. A tie-off clevis may be defined by the longitudinal restraint rod. The restraint surface may be configured to be received by a notch of a cargo. A deployment guide may be disposed on the longitudinal restraint rod. A deployment guide pin may be configured to slideably engage the deployment guide. The cargo restraint may rotate in response to the deployment guide pin slideably engaging the deployment guide. A swivel structure may be coupled between the electromechanical actuator and the cargo restraint to allow the cargo restraint to rotate independent from the electromechanical actuator.

A cargo system may comprise a support structure configured to support a cargo and a cargo restraint coupled to the support structure. The cargo restraint may comprise a longitudinal restraint rod configured to engage the support structure, a restraint surface disposed on the longitudinal restraint rod, and an electromechanical actuator coupled to the longitudinal restraint rod. The electromechanical actuator may deploy and stow the cargo restraint.

In various embodiments, a floor panel may be disposed over the support structure, and the restraint surface may be configured to be flush with the floor panel and/or recessed in the floor panel in response to the cargo restraint being in a stowed position. A position sensor may be in communication with the electromechanical actuator with the electromechanical actuator configured to stow the cargo restraint in response to the position sensor detecting a motion of the cargo sled towards the cargo restraint. The electromechanical actuator may also be configured to deploy the cargo restraint in response to the position sensor detecting a motion of the cargo sled away from the cargo restraint. A deployment guide may be disposed on the longitudinal restraint rod. A deployment guide pin may be configured to slideably engage the deployment guide. The cargo restraint may rotate in response to the deployment guide pin slideably engaging the deployment guide.

A cargo restraint may comprise a longitudinal restraint rod, a restraint surface disposed on the longitudinal restraint rod, and an electromechanical actuator coupled to the longitudinal restraint rod opposite the restraint surface. The electromechanical actuator may be configured to translate the longitudinal restraint rod along an axis of the longitudinal restraint rod.

In various embodiments, a deployment guide may be disposed on the longitudinal restraint rod. The longitudinal restraint rod may also be configured to rotate about the axis in response to a pin slideably engaging the deployment guide. A tie-off clevis may be disposed on the longitudinal restraint rod.

BRIEF DESCRIPTION

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 7 illustrates a portion of a cargo system having a cargo restraint mechanically coupled to an electromechanical actuator, in accordance with various embodiments;

Figure 8A:
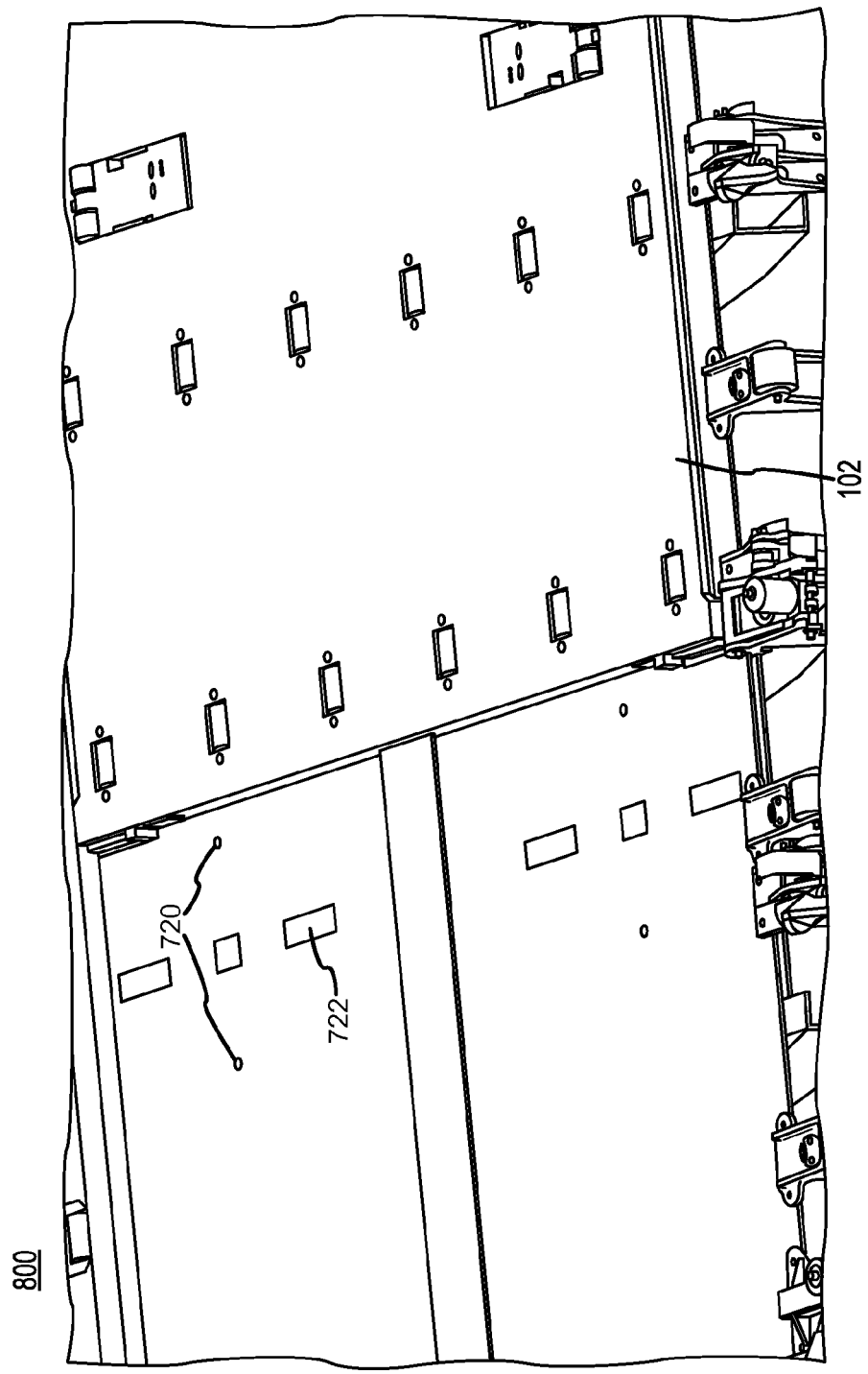
Figure 8B:
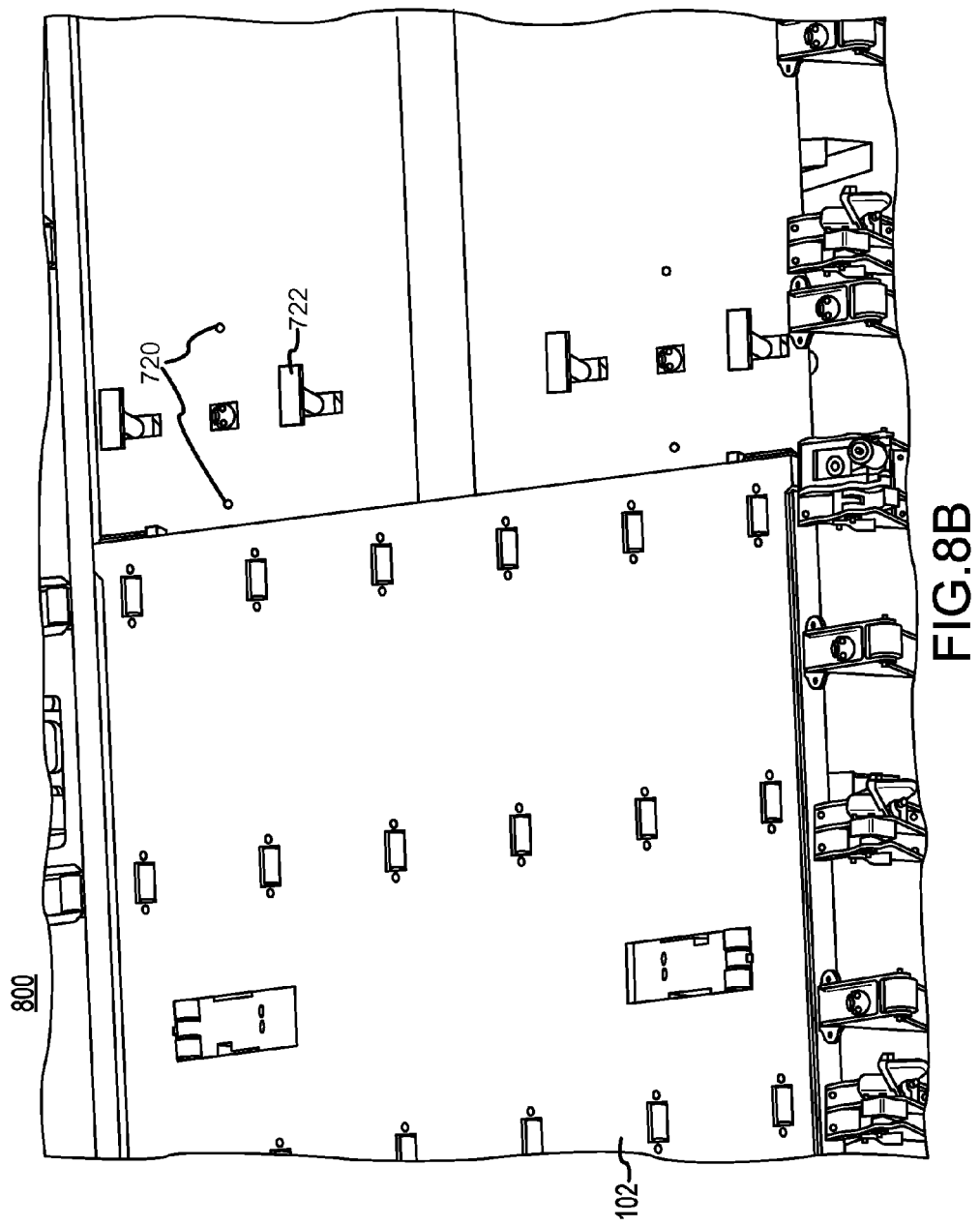

FIG. 8A illustrates a portion of a cargo system having cargo restraints in a stowed position in response to a cargo sled approaching the cargo restraints, in accordance with various embodiments; and FIG. 8B illustrates a portion of a cargo system having cargo restraints in a deployed position in response to a cargo sled passing out of a range of the cargo restraints, in accordance with various embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine engine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
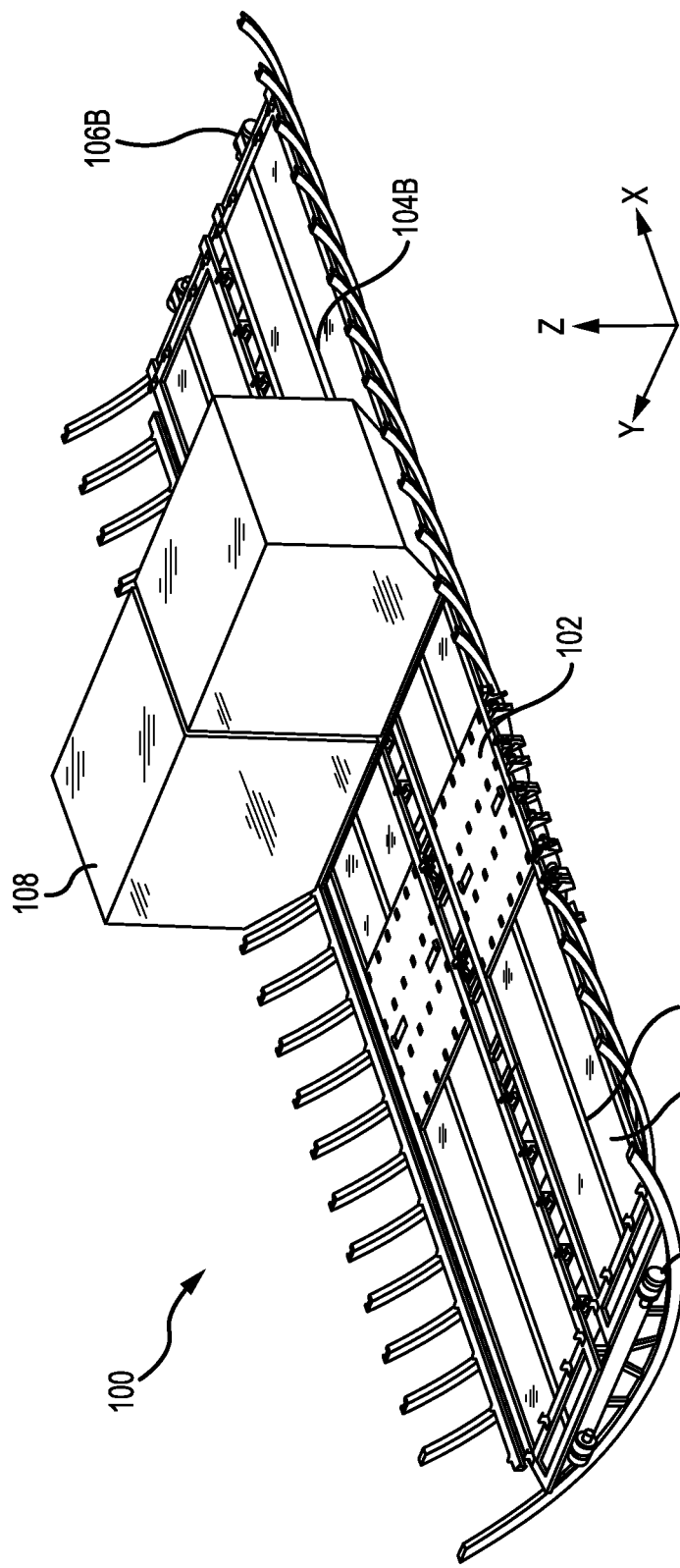
FIG. 1 illustrates an aircraft cargo system, in accordance with various embodiments.

With reference to FIG. 1, an aircraft cargo system 100 is illustrated. Throughout the FIGs., X-Y-Z axes are shown for ease of illustration. Cargo system 100 includes an aft sled drive unit 106A coupled to an aft propulsion belt 104A. Aft propulsion belt 104A is coupled to an air cushion cargo sled 102. Cargo system 100 also includes a forward sled drive unit 106B coupled to a forward propulsion belt 104B. Forward propulsion belt 104B is also coupled to air cushion cargo sled 102. Cargo system 100 also includes a floor panel 112.

Air cushion cargo sled 102 may include a controller and air blowers. The air blowers may be configured to direct a fluid, such as air, into a volume beneath air cushion cargo sled 102. The directed air may result in relatively high pressure (e.g., an air pressure higher than ambient air pressure) in the volume beneath air cushion cargo sled 102. This air pressure may cause air cushion cargo sled 102 to lift above floor panel 112 (i.e., displace air cushion cargo sled 102 in the positive Z direction). Accordingly, it may be desirable for floor panel 112 to be relatively flat so air within the volume below air cushion cargo sled 102 is not released into the atmosphere. The controller may control an amount of air displaced via air blowers in order to alter the pressure beneath air cushion cargo shuttle sled 102, changing the distance that air cushion cargo sled 102 is lifted above floor 112, or allowing air cushion cargo sled to lift cargo 108.

Air cushion cargo sled 102 may be coupled to aft propulsion belt 104A and/or forward propulsion belt 104B. Tension may be applied to aft propulsion belt 104A and/or forward propulsion belt 104B. In response to sufficient tension applied to either propulsion belt, air cushion cargo sled 102 may be displaced forward and/or aft.

The propulsion belts may be wound around a portion of aft sled drive unit 106A or forward sled drive unit 106B. In that regard, a sled drive unit may comprise a cylindrical structure (e.g., a bobbin) to which a sled belt is affixed. The sled drive unit comprises a motive device, such as an electric motor, to rotate the bobbin in a desired direction. The sled drive unit may also disengage the electric motor or be otherwise geared in such a manner so that free rotation of the bobbin is allowed. Thus, as forward sled drive unit 106B may be rotating its bobbin to pull forward propulsion belt 104B forward, aft sled drive unit 106A may allow its bobbin to freely rotate in response to the force exerted by forward propulsion belt 104B through air cushion cargo sled 102. In like manner, as aft sled drive unit 106A may be rotating its bobbin to pull aft propulsion belt 104A aft, forward sled drive unit 106B may allow its bobbin to rotate in response to a predetermined level of tension exerted by aft propulsion belt 104A through air cushion cargo sled 102.

In order to reposition cargo 108 within cargo system 100, the air blowers of air cushion cargo sled 102 may displace a first amount of air, causing air cushion cargo sled 102 to lift above floor panel 112. In various embodiments, air cushion cargo sled 102 is not lifted above floor panel 112 prior to being positioned beneath cargo 108. While air cushion cargo sled 102 is being lifted by air blowers, forward sled drive unit 106B may become engaged and exert pressure on air cushion cargo sled 102 via tension applied to forward propulsion belt 104B. Air cushion cargo sled 102 may then be displaced forward such that it is positioned beneath cargo 108. In response to air cushion cargo sled 102 becoming positioned beneath cargo 108, force applied by forward sled drive unit 106B may be reduced and/or force may be applied via aft sled drive unit 106A causing air cushion cargo sled 102 to remain positioned beneath cargo 108.

While air cushion cargo sled 102 is positioned beneath cargo 108, the controller of air cushion cargo sled 102 may instruct the air blowers to increase the displacement of air beneath air cushion cargo sled 102, causing air cushion cargo sled 102 to be displaced further from floor panel 112, thus lifting cargo 108. When cargo 108 is lifted above floor panel 112, air cushion cargo sled 102 may be moved forward and/or aft based on tension applied to aft propulsion belt 104A and/or forward propulsion belt 104B, without friction forces restricting the movement of air cushion cargo sled 102.

Figure 2:
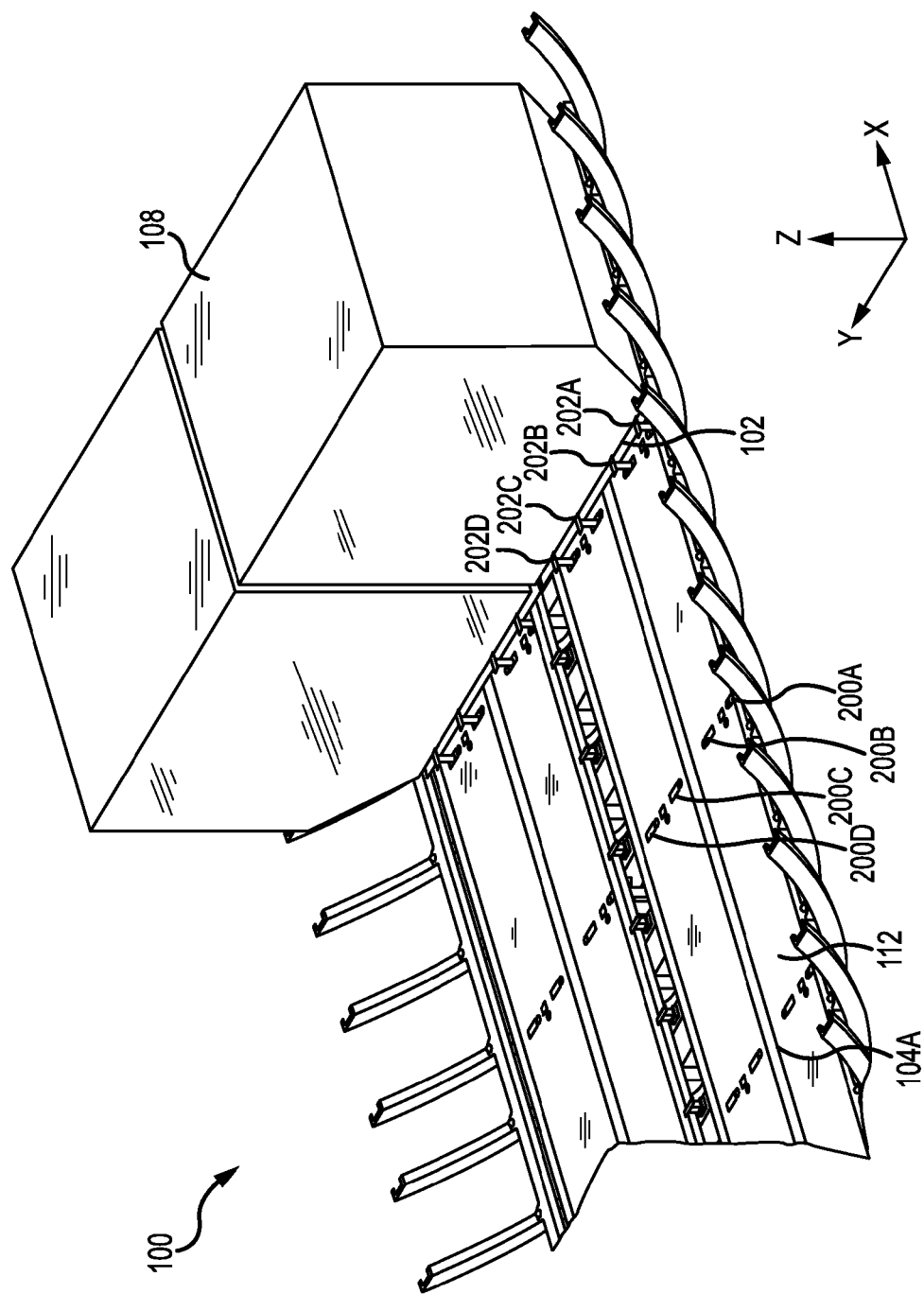
FIG. 2 illustrates a portion of a cargo system including a plurality of cargo restraints in deployed and stowed positions, in accordance with various embodiments.

While an aircraft is in motion, forces may be applied to cargo 108 from, for example, changes in acceleration in any direction. In order to prevent damage to cargo 108 caused by these forces, it is desirable to be able to restrain cargo 108 to floor panel 112. FIG. 2 illustrates a portion of cargo system 100 including a plurality of cargo restraints in deployed and stowed positions. Cargo restraints allow cargo system 100 to restrain cargo.

In FIG. 2, cargo restraints 202 are illustrated in a deployed position and cargo restraints 200 are illustrated in a stowed position. With reference to FIGS. 1 and 2, when cargo restraints 200 are in a stowed position, air cushion cargo sled 102 may move forward or aft over cargo restraints 200 without being restrained by cargo restraints 200 or allowing a significant amount of air to escape the volume beneath air cushion cargo sled 102. While cargo restraints 200 are stowed, air cushion cargo sled 102 may transport cargo 108 over cargo restraints 200 to a desired location on floor panel 112. When cargo 108 is in the desired location, the air blowers of air cushion cargo sled 102 may decrease such that air cushion cargo sled 102 and cargo 108 move towards floor panel 112 (i.e., in the negative Z direction). In response to air cushion cargo sled 102 reaching a predetermined distance from floor panel 112, cargo 108 may contact and rest on floor panel 112 or on support beams of cargo system 100. While cargo 108 is in a resting position, air cushion cargo sled 102 may be moved forward or aft away from cargo 108. Cargo restraints 202 may then be deployed in order to restrain cargo 108.

Figure 3:
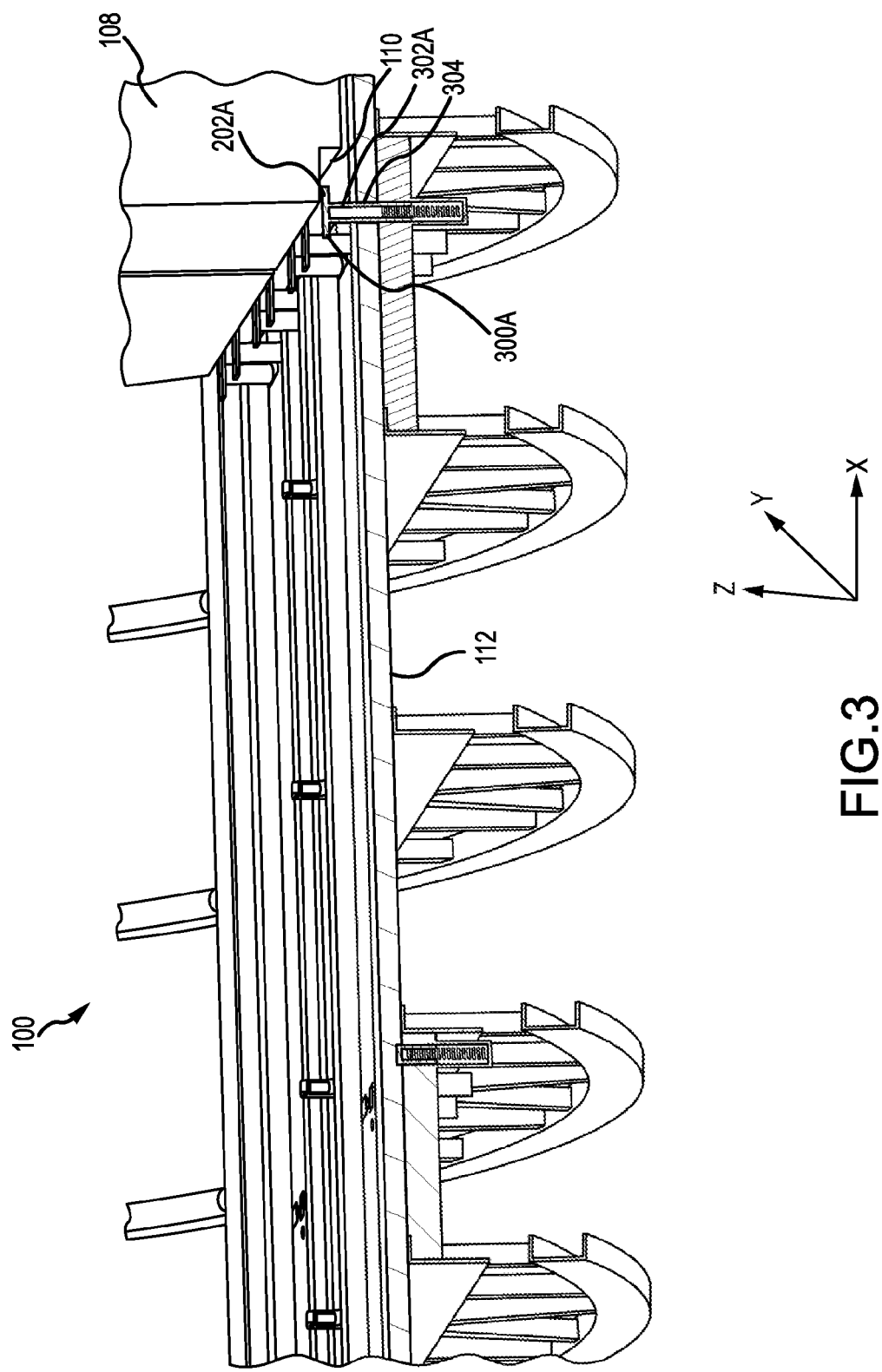
FIG. 3 illustrates a portion of a cargo system, in accordance with various embodiments.

FIG. 3 illustrates a portion of cargo system 100 as viewed along the Y axis. As shown, cargo system 100 includes support structure 304, which may include support beams. Support structure 304 may be positioned below floor panel 112 (i.e., in the negative Z direction from floor panel 112), above floor panel 112 or on the same plane as floor panel 112. Support structure 304 may be designed to support the weight of cargo 108 (i.e., resist forces applied by cargo 108).

Cargo restraint 202A may include a restraint surface 300A and a longitudinal restraint rod 302A. While cargo restraint 202A is stowed, longitudinal restraint rod 302A may be positioned below floor panel 112 in the Z direction or on the same plane as floor panel 112 and restraint surface 300A may be substantially positioned on the same plane as floor panel 112 such that cargo restraint 202A will not interfere with movement of air cushion cargo sled 102 or cause significant leakage of air from volume beneath air cushion cargo sled 102.

While cargo restraint 202A is in the deployed state, restraint surface 300A may extend in the forward and aft directions (i.e., the negative X and the positive X directions) from longitudinal restraint rod 302A. In various embodiments, restraint surface 300A may extend only in the forward direction or only in the aft direction from longitudinal restraint rod 302A.

In various embodiments, cargo 108 may include a notch 110. In various embodiments, cargo 108 is supported by a cargo pallet that includes a notch. Restraint surface 300A may be adapted to be received by notch 110 of cargo 108. In response to cargo restraint 202A being deployed and restraint surface 300A being received by notch 110, cargo restraint 202A may restrict the motion of cargo 108, such as restraining cargo 108 from motion in the aft (negative X) direction and the vertical (positive Z) direction.

Figure 4:
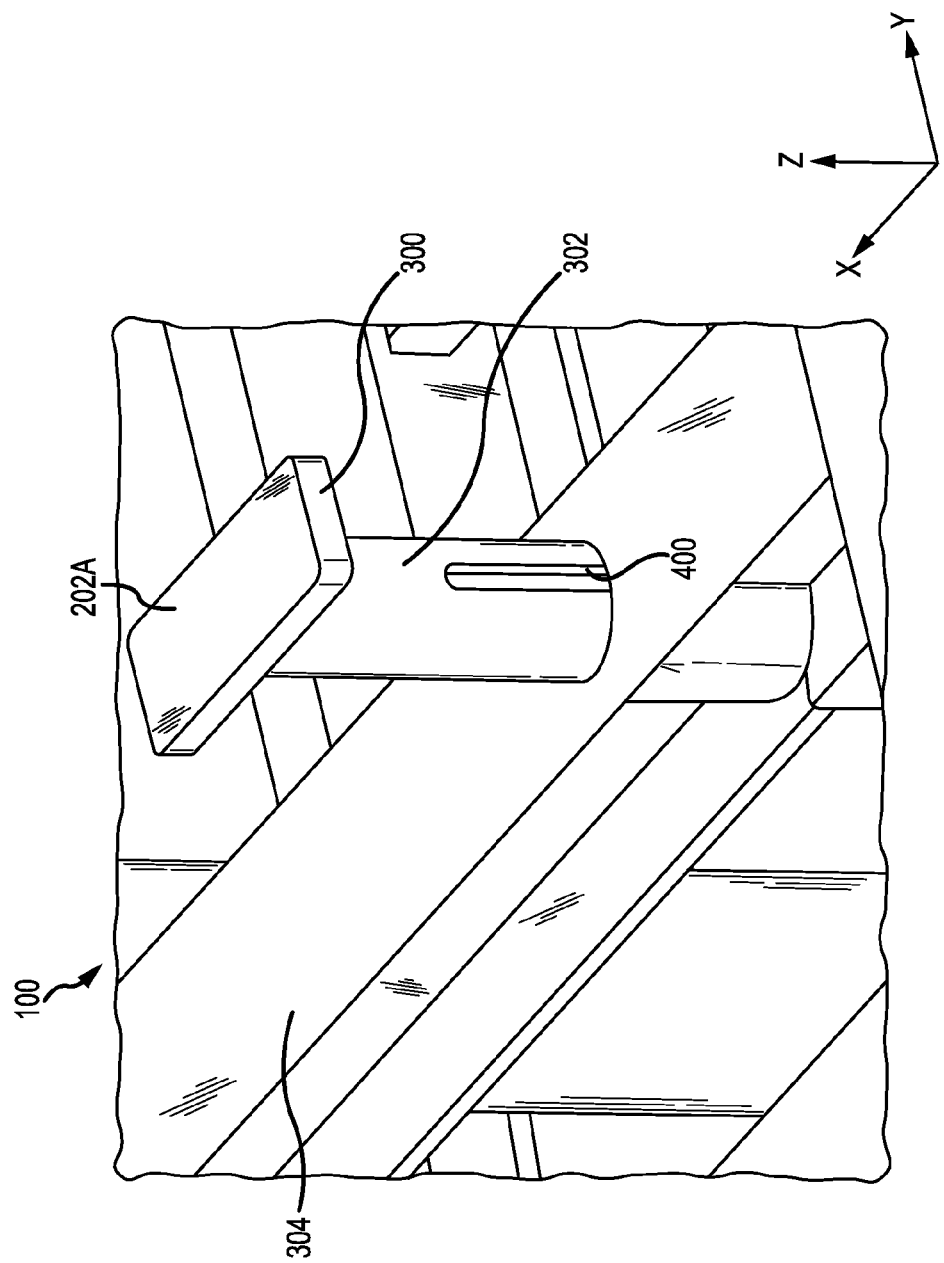
FIG. 4 illustrates a portion of a cargo system including a deployment guide for rotating a restraint in response to stowing and deploying the restraint as viewed from above a support member with a floor panel cutaway, in accordance with various embodiments.

With reference to FIG. 4, a portion of cargo system 100 including a deployment guide 400 for deploying and/or stowing cargo restraint 202A is shown, in accordance with various embodiments. A motive force may be provided to translate cargo restraint 202A in the Z direction from a deployed state, as illustrated, to a stowed state, and from the stowed state to the deployed state. As the cargo restraint 202 translates between stowed and deployed states, longitudinal restraint rod 302 may slideably engage a cylindrical opening in support structure 304. In that regard, cargo restraint 202A may translate into and out of support structure 304 in response to a motive force. Deployment guide 400 may engage a feature, as illustrated in FIG. 5, to rotate restraint surface 300A in the X-Y plane.

Figure 5:
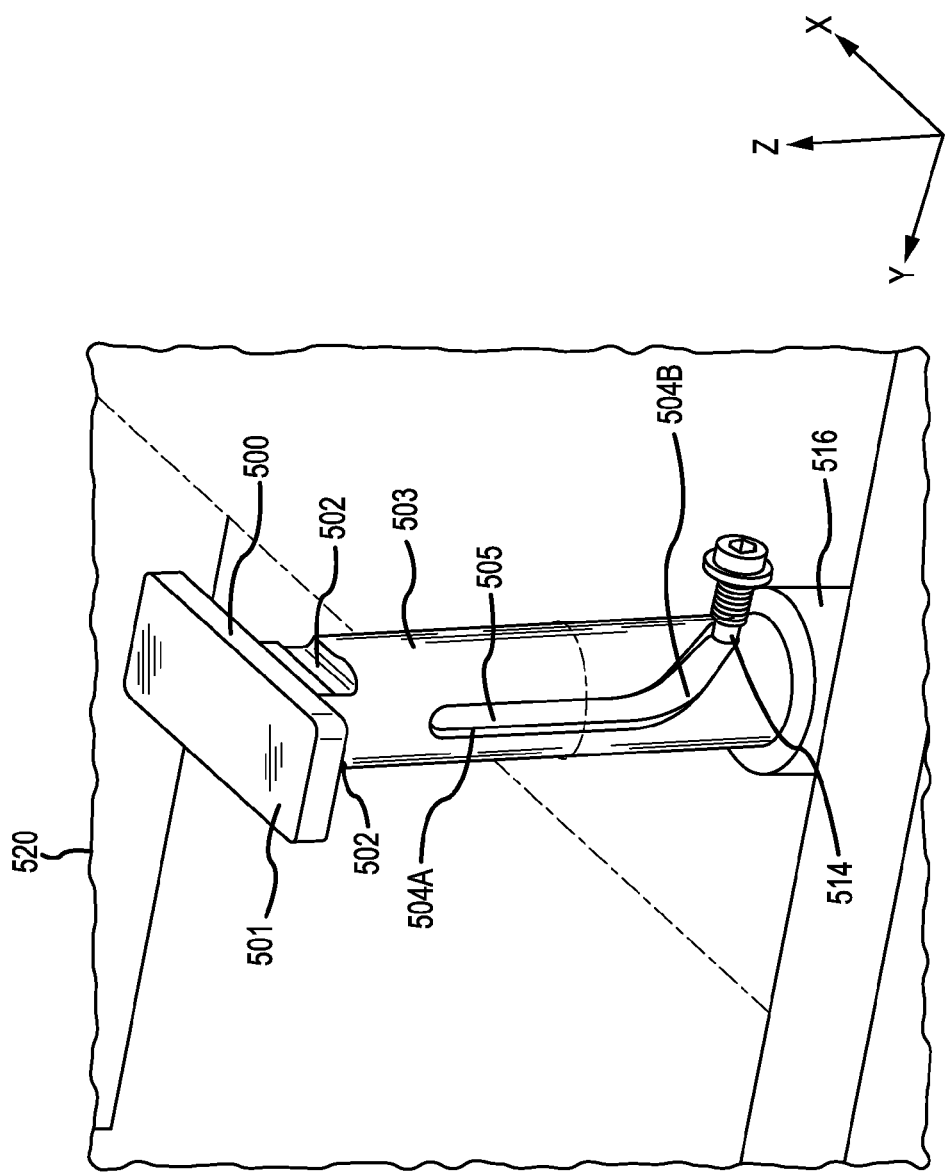
FIG. 5 illustrates a portion of a cargo system including a deployment guide for rotating a restraint in response to stowing and deploying the restraint as viewed through a cutaway support member and floor panel, in accordance with various embodiments.

With reference to FIG. 5, a cargo restraint system 520 is shown having a deployment guide 505 formed on longitudinal restraint rod 503 and a deployment guide pin 514 configured to engage deployment guide 505. Deployment guide pin 514 and deployment guide 505 may position restraint surface 501 and tie-off clevis 502 in a desired angular position about the Z axis. Deployment guide 505 may include a straight portion 504A and a twist portion 504B. Deployment guide pin 514 may be coupled to a fixed support structure (e.g., support structure 304 of FIG. 4) such that movement of deployment guide pin 514 is restrained. In response to cargo restraint 202A being in a stowed position, deployment guide pin 514 may be received by straight portion 504A.

In various embodiments, deployment guide pin 514 may prevent cargo restraint 500 from rotating about the Z axis by engaging straight portion 504A. An actuator 516 may provide a motive force to translate cargo restraint 500 in the Z direction. In response to longitudinal restraint rod 503 translating in the Z direction, deployment guide pin 514 may slideably engage a length of twist portion 504B. Cargo restraint 500 may then rotate about the Z in response to deployment guide pin 514 slideably engaging a length of twist portion 504B. Because deployment guide pin 514 is coupled to a support structure (e.g., support structure 304 of FIG. 3), its position relative to floor panel 112 (of FIG. 1) may be fixed. Cargo restraint 500 may rotate about the Z axis over an arc length determined by the rotational displacement of twist portion 504B about longitudinal restraint rod 503. Restraint surface 501 may rotate a predetermined amount based on the circumferential component of twist portion 504B.

Figure 6:
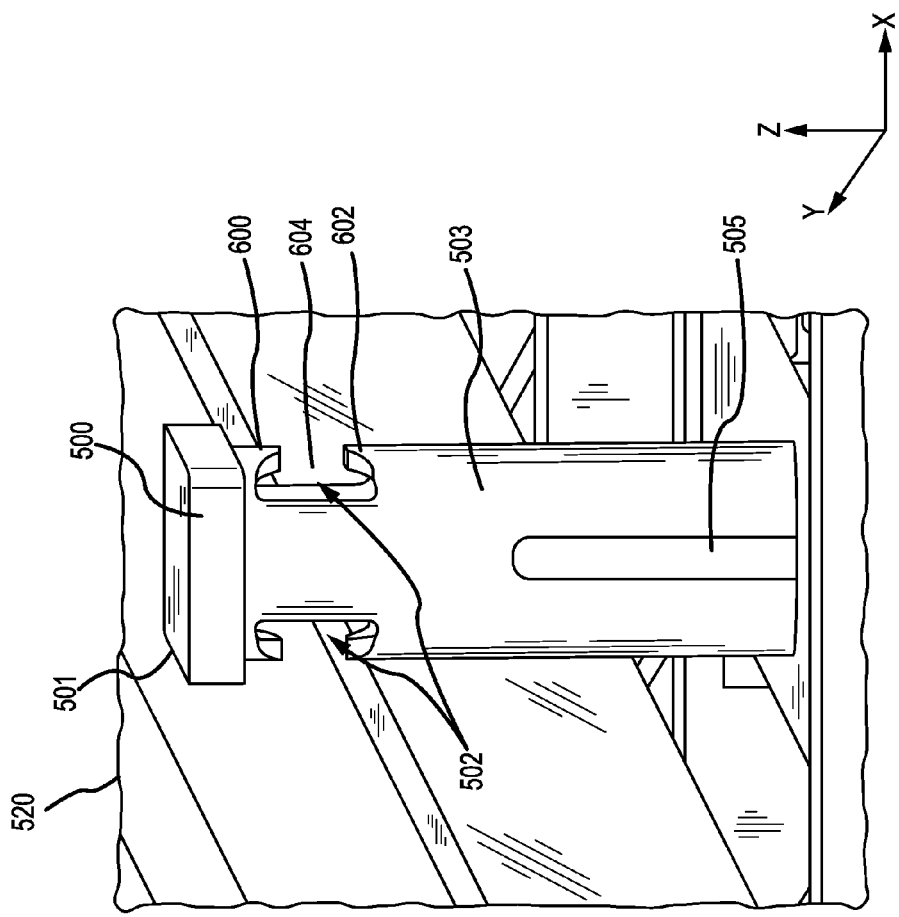
FIG. 6 illustrates a portion of a cargo system with a cargo restraint in a deployed position, in accordance with various embodiments.

With reference to FIG. 6, cargo restraint system 520 is shown with tie-off clevises 502 formed in longitudinal restraint rod 503 of cargo restraint 500, in accordance with various embodiments. Tie-off clevis 502 and cargo restraint 500 may be manufactured using additive manufacturing, etching, casting, forging or any other method of manufacturing. Tie-off clevis 502 may engage belts, cables, nets, ropes, hooks, or the like to restrain cargo. With reference to FIGS. 1 and 6, when cargo is in a position on floor panel 112, additional restraint of cargo may be desirable in addition to restraint surface 501. For example, operators may wish to use ropes to tie down cargo. Tie-off clevis 502 may couple the rope to cargo restraint 500 to restrain cargo during travel.

In various embodiments, tie-off clevis 502 may be defined by a wall of longitudinal restraint rod 503. In various embodiments, tie-off clevises 502 may be positioned on either side of restraint surface 501 and deployment guide 505. Tie-off clevis 502 may include an upper protrusion 600 and a lower protrusion 602 that overhang to define area 604. Area 604 may receive a cargo hook, rope, cable, net, or other suitable ties for tying down cargo. Upper protrusion 600 and lower protrusion 602 may restrict motion of the ties such that the ties may be retained in area 604 of tie-off clevis 502.

With reference to FIG. 7, a cargo restraint deployment system 700 is shown, in accordance with various embodiments. Cargo restraint deployment system 700 may comprise an actuator 702 mechanically coupled to a cargo restraint 722 to provide motive force to cargo restraint 722. Cargo restraint 722 may be the same as cargo restraints 200 and 202 from FIG. 2. Cargo restraint deployment system 700 is illustrated with cargo restraint 722 in a deployed position.

In various embodiments, actuator 702 may comprise housing 704 retaining internal components of actuator 702. Actuator 702 may be an electromechanical actuator comprising actuator drive motor 708. Actuator drive motor 708 may include a rotor magnetically coupled to a stator with rotary position sensor 706 monitoring the position of the rotor relative to the stator. Actuator drive motor 708 may provide rotary energy to gear box 710. Gear box 710 may rotate ball screw 712 to move ball spline nut 714 relative to ball screw 712. Linear position sensor 716 may monitor the position of ball spline nut 714 about ball screw 712 to determine whether cargo restraint 722 is in a deployed, stowed, or intermediate position. Although an electromechanical actuator is shown, actuator 702 may also be a pneumatic or hydraulic piston or other source of controlled linear motion.

In various embodiments, ball spline nut 714 may be coupled to swivel structure 718. As illustrated in FIGS. 4-6, cargo restraint 722 may rotate in addition to translating linearly during deployment. Swivel structure 718 may allow cargo restraint 722 to rotate while ball spline nut 714 remains in linear translation. In that regard, cargo restraint 722 may rotate at a different rate than ball spline nut 714 in response to linear translation. Proximity sensors 720 may be in electronic communication with actuator 702 directly and/or through a master control unit. Actuator 702 may be commanded to translate in response to input from proximity sensors 720.

With reference to FIG. 8A, restraint deployment system 800 is shown with proximity sensors 720 disposed in floor panel 112 with air cushion cargo sled 102 approaching cargo restraint 722, in accordance with various embodiments. Proximity sensors 720 may be optical, ultrasonic, and/or electromagnetic sensors configured to detect a position of air cushion cargo sled 102 along floor panels 112. Proximity sensors 720 may detect position and/or movement of air cushion cargo sled 102. In various embodiments, a controller may monitor the change in position over time to detect motion. Although air cushion cargo sled 102 is illustrated as hovering on an air film, proximity sensors 720 and restraint deployment system 800 may also be used in conjunction with rolling, sliding, or otherwise moving cargo sleds. As air cushion cargo sled 102 approaches cargo restraint 722, proximity sensors 720 may detect the position of air cushion cargo sled 102. Cargo restraint 722 may stow in response to air cushion cargo sled 102 moving within a threshold distance of proximity sensors 720.

With reference to FIG. 8B, restraint deployment system 800 is shown with proximity sensors 720 disposed in floor panel 112 with air cushion cargo sled 102 moving away from cargo restraint 722, in accordance with various embodiments. Air cushion cargo sled 102 may be departing cargo restraints 722 after having passed over cargo restraints 722 in a stowed position (as shown in FIG. 8A). Proximity sensors 720 may detect the position of air cushion cargo sled 102 as the sled moves away from cargo restraints 722. Cargo restraints 722 may deploy in response to air cushion cargo sled 102 moving outside of a threshold distance from cargo restraints 722. In that regard, restraint deployment system 800 may automatically stow and deploy cargo restraints in response to movement of air cushion cargo sled 102. Air cushion cargo sled 102 may thus move unimpeded by cargo restraints 722. The deployment and stow command may also be issued manually by a controller in communication with a fixed or hand held control panel operated by a user. A hand held control panel may be connected via wired or wireless communications to restraint deployment system 800.

In various embodiments, cargo restraint 722 may rest with restraint surface (e.g., restraint surface 501 of FIG. 5) flush with floor panel 112 or recessed slightly within floor panel 112 when in a stowed position. In that regard, cargo restraint 722 in a stowed position may enable air cushion cargo sled 102 to pass over cargo restraint 722 despite having little clearance between air cushion cargo sled 102 and floor panel 112. Similarly, proximity sensors may be flush with floor panel 112 or slightly recessed in floor panel 112. Cargo restraint 722 may also protrude from floor panel 112 when in a deployed position to inhibit movement of air cushion cargo sled 102 and/or cargo.

The electronically actuated cargo restraints of the present disclosure enable automatic retraction and deployment of the cargo restraints. Automatic deployment of the cargo restraints may tend to reduce load and/or unload times by allowing an air cushion cargo sled to pass without stopping and/or with little delay. The proximity sensors enable automated retraction and/or deployment absent direct user control. The sensors may also notify a user so that the user may manually retract and/or deploy cargo restraints as desired.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo system, comprising:
   a floor panel;
   a cargo sled configured to move across the floor panel;
   a cargo restraint configured to translate relative to the floor panel, the cargo restraint comprising:
      a longitudinal restraint rod configured to protrude from the floor panel in a deployed position; and
      a restraint surface disposed on the longitudinal restraint rod, wherein the cargo restraint is configured to enable the cargo sled to pass over the restraint surface in a stowed position;
   an electromechanical actuator mechanically coupled to the longitudinal restraint rod, wherein the electromechanical actuator is configured to deploy and stow the cargo restraint; and
   a position sensor in communication with the electromechanical actuator, wherein the electromechanical actuator is configured to automatically stow the cargo restraint in response to the position sensor detecting a motion of the cargo sled towards the cargo restraint.

2. The cargo system of claim 1, wherein the restraint surface is configured to lie flush with the floor panel or recessed within the floor panel in the stowed position.

3. The cargo system of claim 1, wherein the electromechanical actuator is configured to automatically deploy the cargo restraint in response to the position sensor detecting a motion of the cargo sled away from the cargo restraint.

4. The cargo system of claim 1, further comprising a tie-off clevis defined by the longitudinal restraint rod.

5. The cargo system of claim 1, wherein the restraint surface is configured to be received by a notch of a cargo.

6. The cargo system of claim 1, further comprising a deployment guide disposed on the longitudinal restraint rod.

7. The cargo system of claim 6, further comprising a deployment guide pin configured to slideably engage the deployment guide.

8. The cargo system of claim 7, wherein the cargo restraint is configured to rotate in response to the deployment guide pin slideably engaging the deployment guide.

9. The cargo system of claim 1, further comprising a swivel structure coupled between the electromechanical actuator and the cargo restraint, wherein the swivel structure is configured to allow the cargo restraint to rotate independent from the electromechanical actuator.

10. A cargo system, comprising:
    a support structure configured to support a cargo;
    a cargo restraint coupled to the support structure and comprising:
       a longitudinal restraint rod configured to engage the support structure; and
       a restraint surface disposed on the longitudinal restraint rod;
    an electromechanical actuator coupled to the longitudinal restraint rod, wherein the electromechanical actuator is configured to deploy and stow the cargo restraint; and
    a position sensor in communication with the electromechanical actuator, wherein the electromechanical actuator is configured to stow the cargo restraint in response to the position sensor detecting a motion of the cargo sled towards the cargo restraint.

11. The cargo system of claim 10, further comprising a floor panel disposed over the support structure, wherein the restraint surface is configured to be at least one of flush with the floor panel or recessed in the floor panel in response to the cargo restraint being in a stowed position.

12. The cargo system of claim 10, wherein the electromechanical actuator is configured to deploy the cargo restraint in response to the position sensor detecting a motion of the cargo sled away from the cargo restraint.

13. The cargo system of claim 10, further comprising a deployment guide disposed on the longitudinal restraint rod.

14. The cargo system of claim 13, further comprising a deployment guide pin configured to slideably engage the deployment guide.

15. The cargo system of claim 14, wherein the cargo restraint is configured to rotate in response to the deployment guide pin slideably engaging the deployment guide.

16. A cargo restraint, comprising:
    a longitudinal restraint rod;
    a restraint surface disposed on the longitudinal restraint rod; and
    an electromechanical actuator coupled to the longitudinal restraint rod opposite the restraint surface, wherein the electromechanical actuator is configured to translate the longitudinal restraint rod along an axis of the longitudinal restraint rod, wherein the electromechanical actuator is in communication with a position sensor and is configured to automatically stow the cargo restraint in response to the position sensor detecting a motion of a cargo toward the cargo restraint.

17. The cargo restraint of claim 16, further comprising a deployment guide disposed on the longitudinal restraint rod, wherein the longitudinal restraint rod is configured to rotate about the axis in response to a pin slideably engaging the deployment guide.

18. The cargo restraint of claim 16, further comprising a tie-off clevis disposed on the longitudinal restraint rod.

* * * * *